3,325,982
HARVESTER FOR TALL ROW CROPS
Mintauts Warner Fogels and James Kenneth Gaunt, Essendon, Victoria, and Jacek Januariusz Zagorski, Balwyn, Victoria, Australia, assignors to Massey-Ferguson (Australia) Limited, Sunshine, Victoria, Australia, a corporation of Victoria
Filed Oct. 5, 1964, Ser. No. 401,604
Claims priority application Australia, Oct. 4, 1963, 36,103/63
12 Claims. (Cl. 56—56)

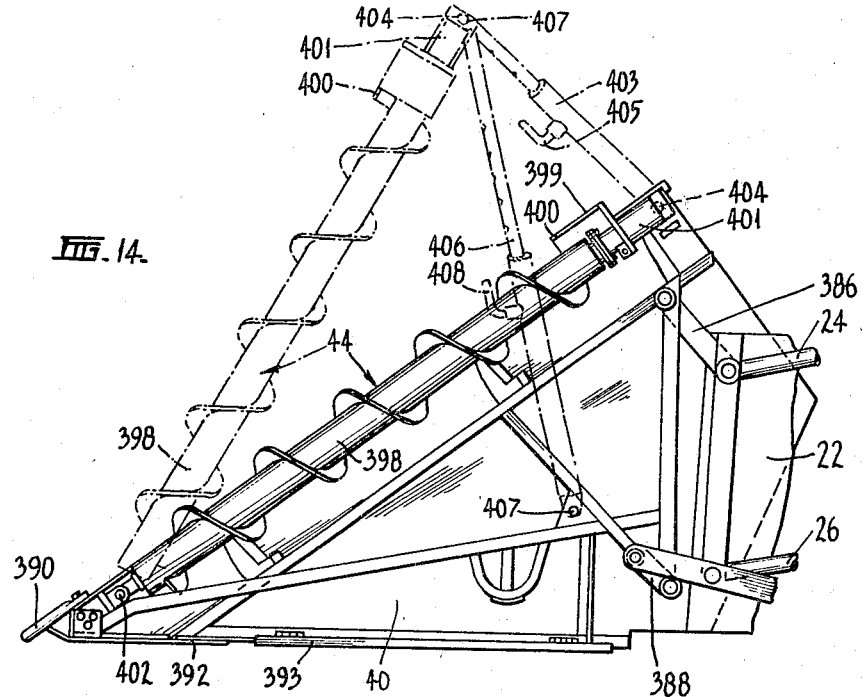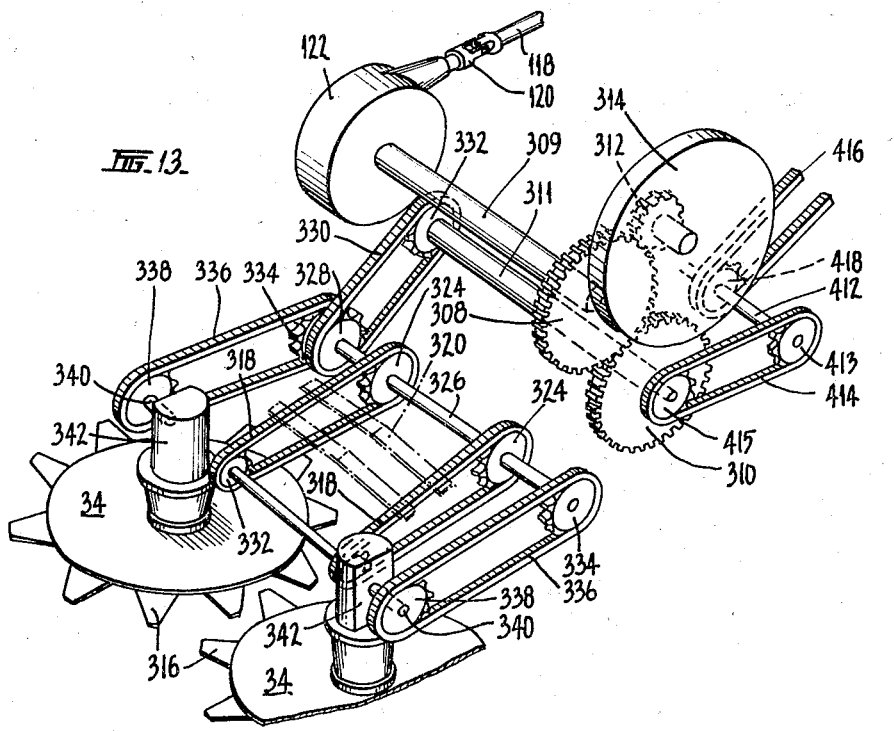

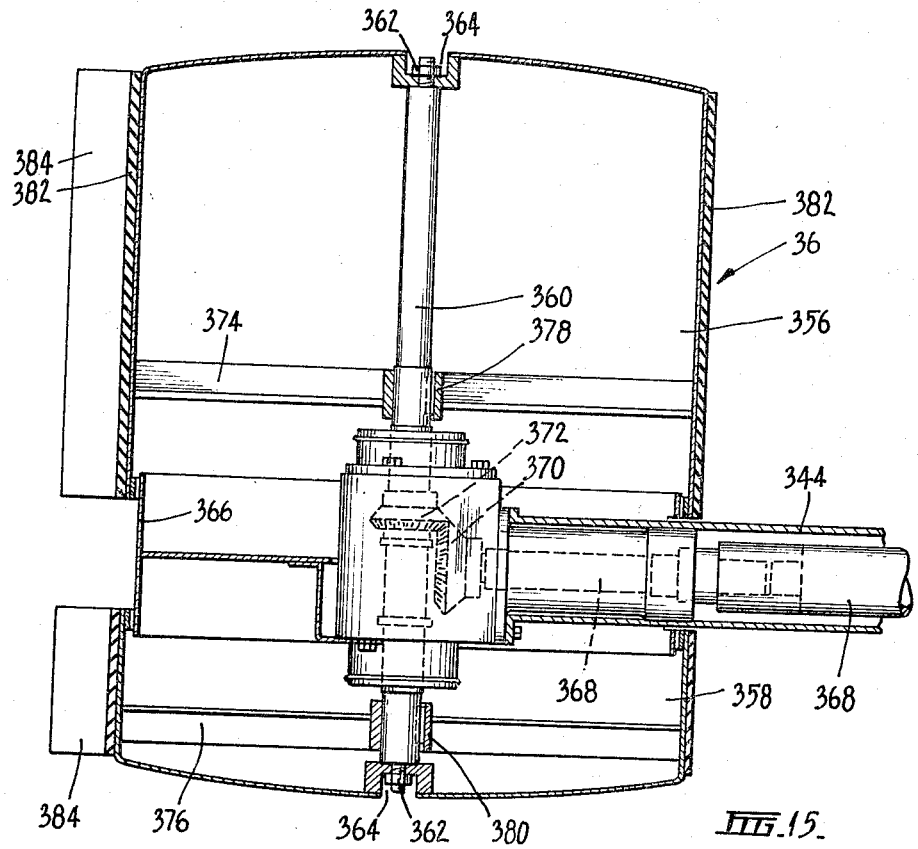
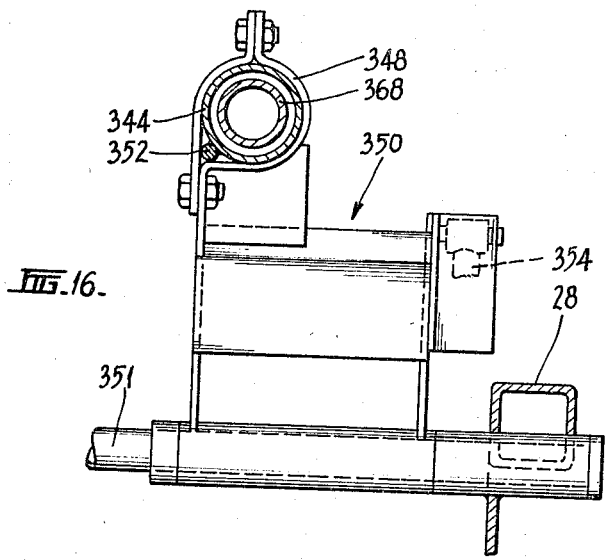

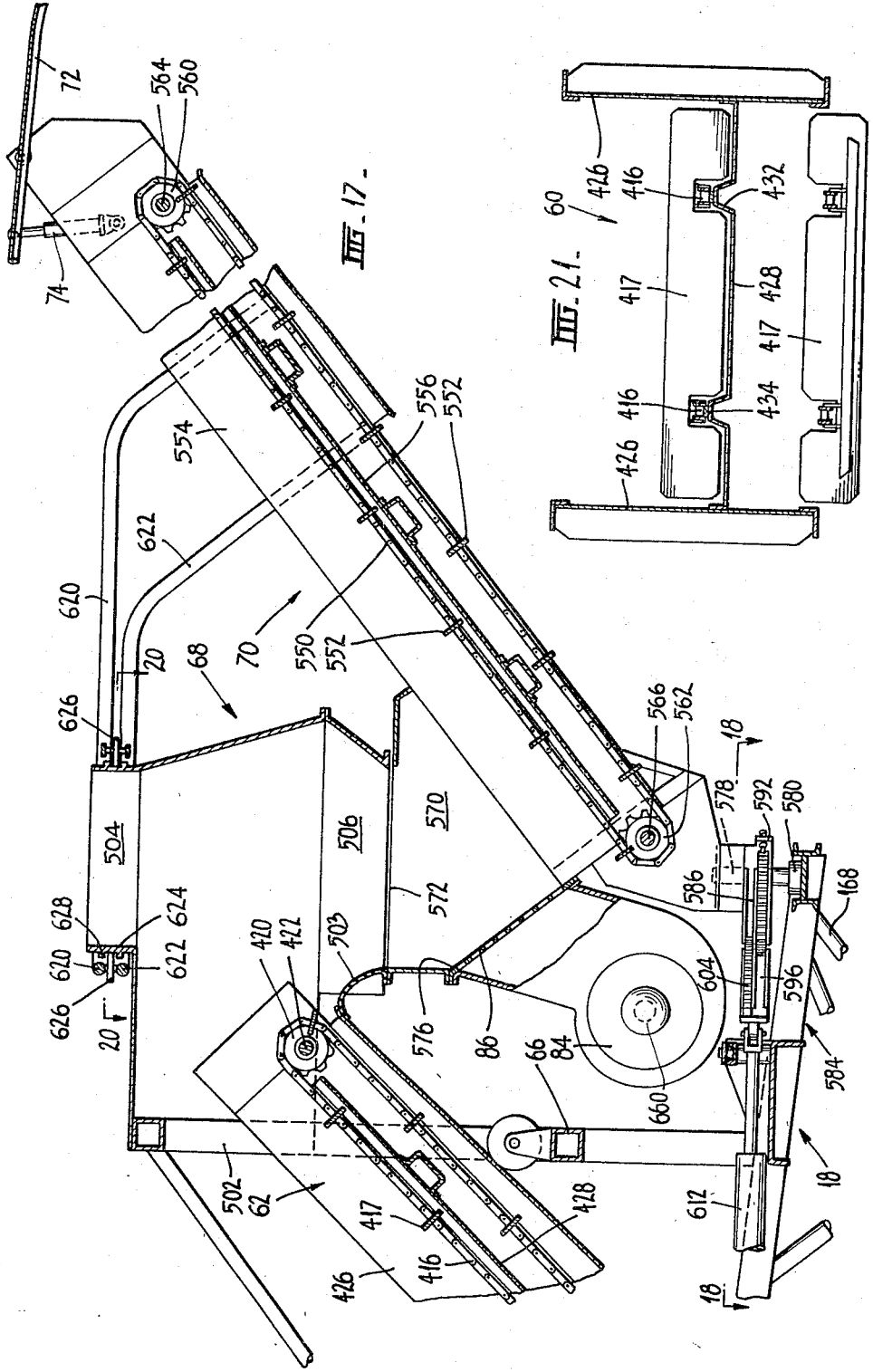

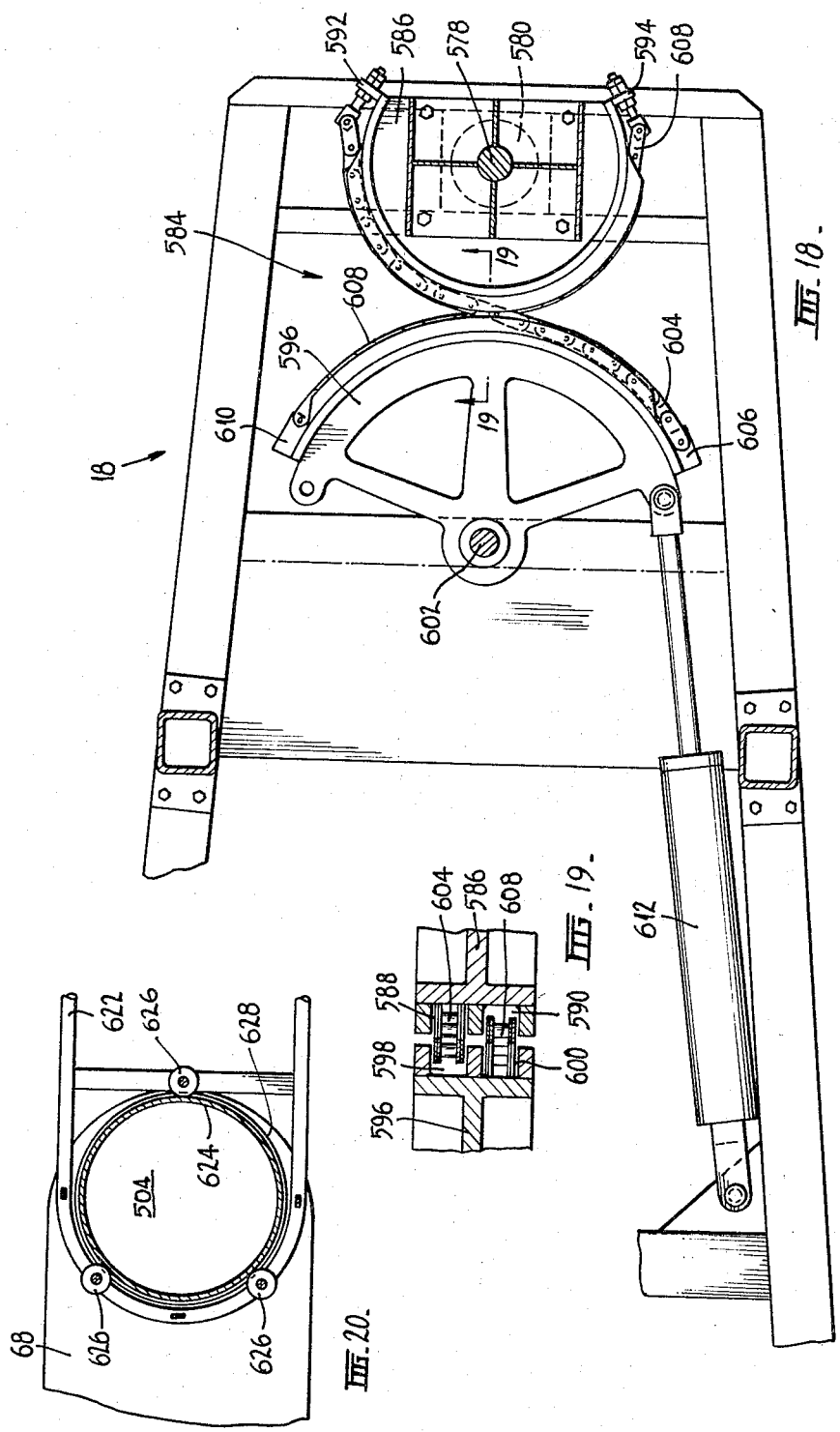

In the specification of our prior Australian Patent No. 218,591, we have disclosed a sugar cane harvester which is attachable to one side of a tractor and which includes apparatus for cutting the severed cane sticks into short lengths.

It is sometimes desirable to commence the operation of harvesting a crop of standing cane by removing an intermediate row thereof, while also it is advantageous to remove successive rows of cane by driving the harvester in opposite directions along these rows. A harvester which projects laterally from one side of a tractor is not suitable for either of these purposes as a machine for removing an intermediate row must be capable of passing between the adjacent rows on each side thereof, while also a side mounted machine is adapted to move in one direction only along an exterior row because the tractor must be arranged outwardly to one side of the harvester.

Among other things, the present invention provides a harvester which is not subject to the aforesaid limitations, while also it provides various improvements applicable to tall crop harvesters of the previously known type.

Accordingly, one object of the invention is to provide a self-propelled harvester adapted to pass between alternate rows of the crop.

Another object is to provide improved means for cutting the tops from tall crop.

A further object is to provide improved gathering means for feeding tall crop to crop base cutting means of the harvester.

Yet another object is to provide improved means for severing the crop at its base and for controlling the operating height of the severing means.

Another object is to provide improved means for elevating and discharging the harvested material including means whereby the material may be discharged in any one of a plurality of alternative directions.

Another object is to provide various improvements in means for removing unwanted tops from the standing crop and for adjusting the height of such means to suit the crop.

Still further objects are to provide improvments in the general construction and arrangement of the apparatus and in means for transmitting motion to or otherwise actuating the various operative parts of the machine.

With the foregoing and other objects in view the invention in one of its aspects includes a tall crop harvester comprising a self-propelled power unit; crop gathering means, base cutting means, and crop chopping apparatus adjustably supported by and arranged forwardly of the power unit; and means including an elevator conveyor arranged to receive the chopped crop and discharge it at a suitable height to either side of or to the rear of the harvester.

In another aspect the invention includes a crop cutting unit for a tall crop harvester, said unit comprising a housing adapted to be supported from said harvester, a crop base cutter disc rotatably mounted in the forward end of said housing, a pair of chopper drums rotatably mounted in the rearward end of said housing, and means to feed crop cut by said base cutter disc to said chopper drums.

In yet another aspect the invention includes gathering means for feeding material to a tall crop harvester, said means comprising a pair of spaced, generally vertically walls adapted to be supported at the forward end of the harvester in generally longitudinal relationship thereto, said walls having forwardly and downwardly inclined upper edges adapted to pass under and lift sprawled, fallen and leaning crop.

In still another aspect the invention includes a top cutter unit for a tall crop harvester, said unit comprising a rotatable cutter, and a pair of forwardly projecting divergent gathering arms adapted to guide the tops to said cutter.

The invention further includes mounting means for a top cutter unit for a tall crop harvester, said means comprising an extensible boom pivotally mounted at or adjacent one of its ends of said harvester, and a telescopic prop adapted to support said boom, said prop being pivotally connected at one of its ends to said boom and pivotally connected at its other end to the harvester.

The invention also includes feeder drum means for a tall crop harvester, comprising two drum sections mounted on opposite ends of a rotatable shaft, a support arm supporting said shaft for rotation, a fluid operated rotary motor mounted at one end of said support arm, and a drive shaft within said support arm adapted to transmit motion from said motor to said rotatable shaft.

Other features of the invention are set forth in the following more particular description of one representative form of the invention as applied to a sugar cane harvester which is illustrated in the accompanying drawings wherein:

FIGURE 13 is a perspective view of the parts illustrated in FIGURES 11 and 12;

FIGURE 14 is a side view of one gathering wall taken on line 14—14 of FIGURE 9;

FIGURE 15 is a sectional plan view of the feeder drum taken on line 15—15 of FIGURE 10;

FIGURE 16 is a front view of the bracket on which the feeder drum is mounted and is a section on line 16—16 of FIGURE 10;

FIGURE 17 is a side view, partly in section, of the upper end of the primary elevator, the hood and the secondary elevator;

FIGURE 18 is a plan view of the mechanism for rotating the secondary elevator taken on line 18—18 of FIGURE 17;

FIGURE 19 is a sectional elevation on line 19—19 of FIGURE 18;

FIGURE 20 is a plan view showing the support of the secondary elevator at the top of the hood, and is a section on line 20—20 of FIGURE 17; and FIGURE 21 is a sectional end view of the primary elevator.

Figure 1:
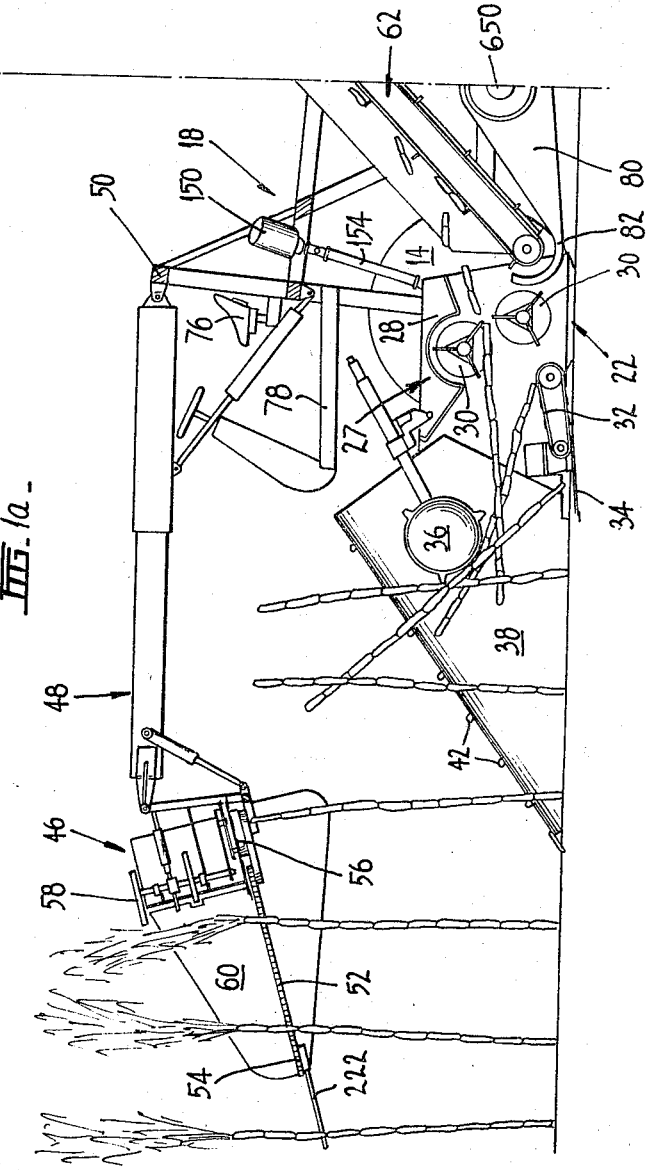
FIGURE 1a is a side view, partly in section, of the forward part of a harvester according to the invention.
FIGURE 1b is a side view, partly in section, of the harvester.

The machine and its operation will first be described generally in relation to FIGURES 1a, 1b, 2a and 2b.

The machine comprises a power unit generally indicated at 10 and having two pairs of transport wheels 14 and 16 of which the rear pair 16 is steerable. The wheels are mounted on a frame 18 which also supports a diesel or other suitable engine 20 and various drive components which will be hereinafter described.

An intermediate unit generally indicated at 22 is mounted on the forward end of the frame 18 by means of upper and lower pairs of parallel links 24 and 26 (see FIGURES 9 and 10), one link of each pair being located at each side of the intermediate unit. Links 24, 26 constitute a parallelogram linkage which allows intermediate unit 22 to move upwardly and downwardly while maintaining a constant attitude to the ground. The intermediate unit comprises a housing 27 having a pair of side walls 28 between which are mounted a pair of rotatable chopper drums 30, a base conveyor 32, a pair of base cutter discs 34, and a feeder drum 36.

Supported from the forward ends of the side walls 28 is a pair of crop gathering walls 38 and 40, the upper edges of which slope forwardly and downwardly. Respective conveyors 42 and 44 project beyond the upper edges of the crop gathering walls and serve to lift fallen sticks of cane.

A top cutter generally indicated at 46 is supported at the outer end of a boom 48 pivotally attached to an upwardly extending frame member 50. The top cutter comprises a pair of gathering arms 52 provided with respective gathering conveyors 54 which feed the cane tops to a rotatable cutter disc 56. A pair of rotary flingers 58 and a pivotally mounted deflector plate 60 serve to deflect the cut tops to either side of the top cutter as required.

A primary elevator conveyor 62 is pivotally mounted at its lower end on the intermediate unit 22 and is supported adjacent its upper end on a pair of rollers 64 rotatably mounted on a frame member 66 (see FIGURE 17). The upper end of the elevator conveyor 62 projects into a hood 68 on which is pivotally mounted a discharge elevator conveyor 70. A guide flap 72 is pivotally mounted on the upper end of the discharge elevator 70 and is controlled by means of a hydraulic cylinder 74.

Figure 2:
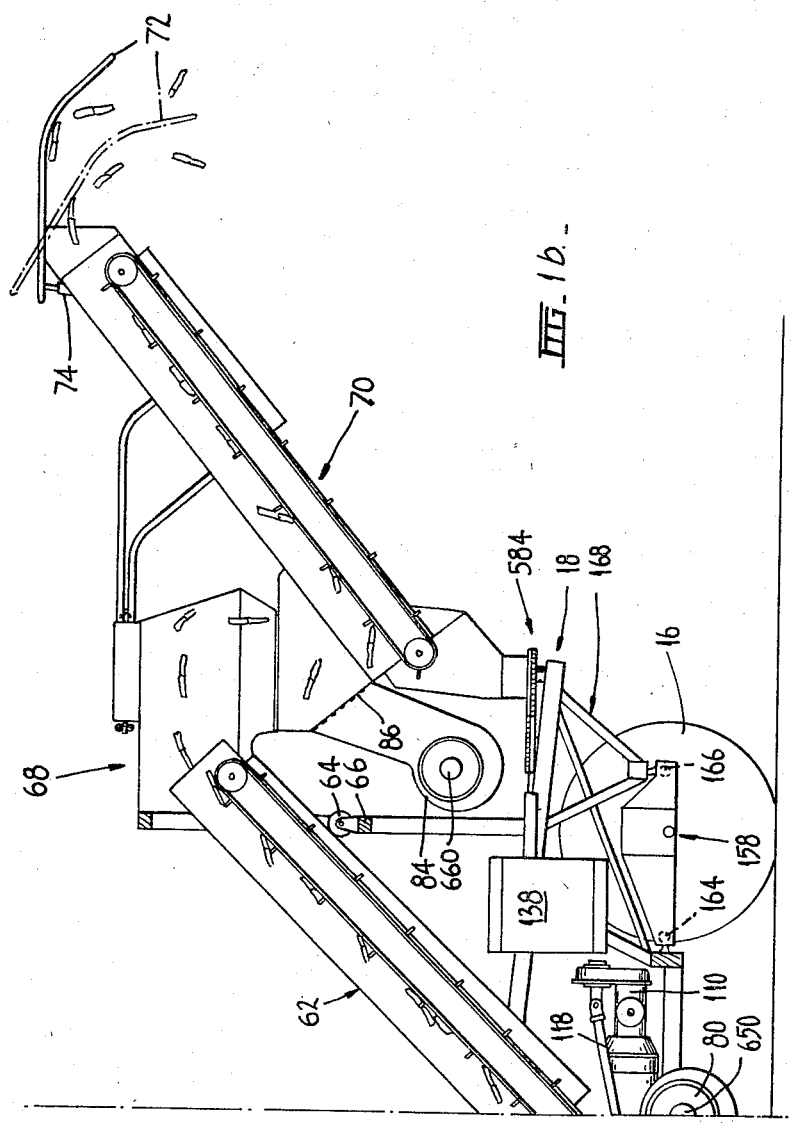
FIGURE 2b is a plan view of the rear part of the machine shown in FIGURE 1b.

The discharge elevator 70 may adopt one of the three positions shown in FIGURE 2b. In the first of these positions, that shown in full lines in the drawing, the elevator is adapted to feed cut cane to a truck or transporter travelling on the left-hand side of the harvester.

In its second position, shown as 70a on the drawing, the discharge elevator is aligned with the axis of the harvester and is adapted to feed cut cane to a truck travelling behind the harvester.

In its third position, shown as 70b in the drawing, the discharge elevator feeds the cane to a truck travelling on the right-hand side of the harvester.

Discharge elevator 70 is placed in position 70a when the harvester is being used to open up a field of cane by removal of an intermediate row. Rows of sugar cane are normally planted approximately 4′6″ to 5′ apart and hence it is necessary for the truck to travel directly behind the machine. Once the field has been opened up this condition no longer applies and it is usually found more convenient to have the truck on the side of the machine remote from the standing cane rather than directly behind the machine.

The machine is controlled by an operator from a driving seat 76 on a platform 78 at the forward end of the power unit 10. Controls for most of the operative parts of the machine are within reach of the driver on the platform. Preferably provision is made for control of the machine from either side and to this end there are provided two driving seats 76, only one of which is shown, with duplicated interconnected controls.

The operation of the machine is briefly as follows:

The top cutter 46 is initially set to a suitable height and angle to cut off the tops of the sugar cane. In FIGURE 1a the top cutter unit 46 has been illustrated with its gathering arms and cutter disc tilted downwardly at an angle of approximately 15°, this being the angle which, in practice, appears to achieve best results. In addition the position of top cutter unit 46 is adjusted in relation to drum 36 by extending or retracting boom 48, so that canes deflected forwardly by the drum will not interfere with the operation of top cutter unit 46. The taller the cane, the further forward the top cutter unit will need to be located. The discharge elevator is rotated to the required one of its three positions and the housing of the intermediate unit is set to a height which will enable the cutter discs 34 to cut the crop at or slightly below ground level.

The machine is then driven into the crop with its centre line substantially aligned with a row of cane. The overall width of the machine is such that it can pass between two alternate rows of cane without damaging them. As the machine passes along a row of cane, the cane tops are removed by the top cutter 46 and thrown free of the throat of the machine to one side or the other by means of the flingers 58. Fallen sticks of cane are aligned and lifted by means of the gathering walls 38 and 40 and the conveyors 42 and 44.

The feeder drum 36 contacts the standing canes and pushes them forward in the direction of motion of the machine so that they will be suitably positioned after cutting at ground level by the base cutter discs 34 to be fed butt foremost into the machine. The butt ends of the cut canes are contacted by the feed conveyor 32 and fed to the chopper drums 30 which cut them into pieces approximately 15 inches in length and project them onto the elevator conveyor 62.

While these pieces are in the air between the chopper drums and the conveyor they are subjected to an air blast from fan 80 through manifold 82 and are thereby separated from much of the trash which has found its way into the machine. The pieces of cane are fed upwards into the hood 68 and drop under the influence of gravity onto the lower end of discharge elevator conveyor 70. While in the air between the two elevator conveyors the pieces of cane are subjected to a further air blast from fan 84 through a screen or grille 86 in the base of hood 68. Any trash still remaining with the cut pieces of cane pass out through opening 84 in the top of the hood.

The angular position of guide flap 72 is adjusted from time to time by means of hydraulic cylinder 74 to spread the pieces of cane evenly over the truck to which they are fed.

The individual sections of the machine which contribute to the above operations will now be described in more detail.

*Power unit*

Figure 3:
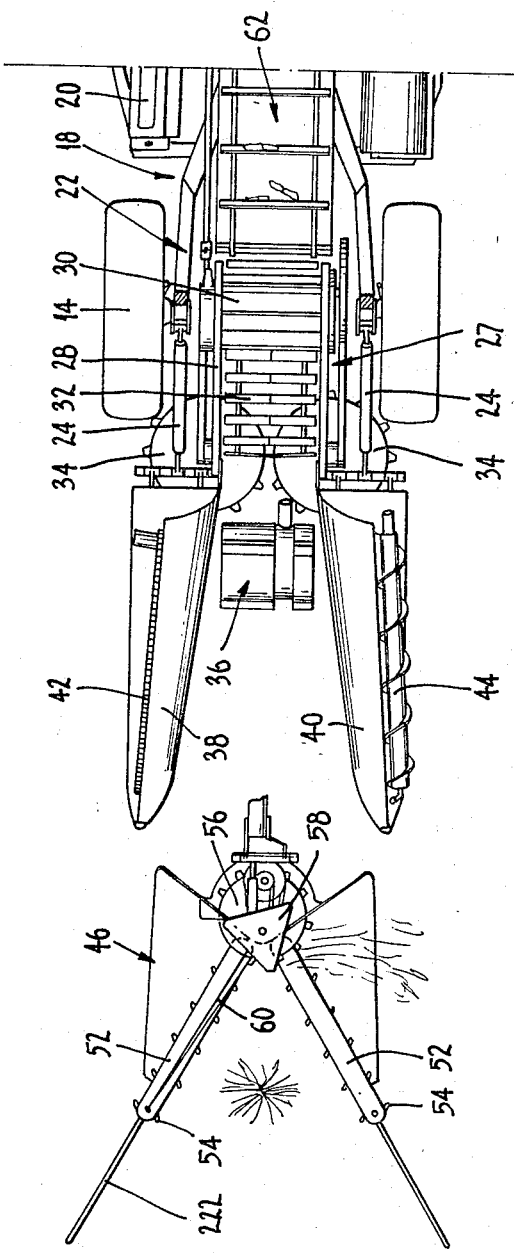
FIGURE 3 is a plan view of part of the machine showing mainly the power unit.
Figure 4:
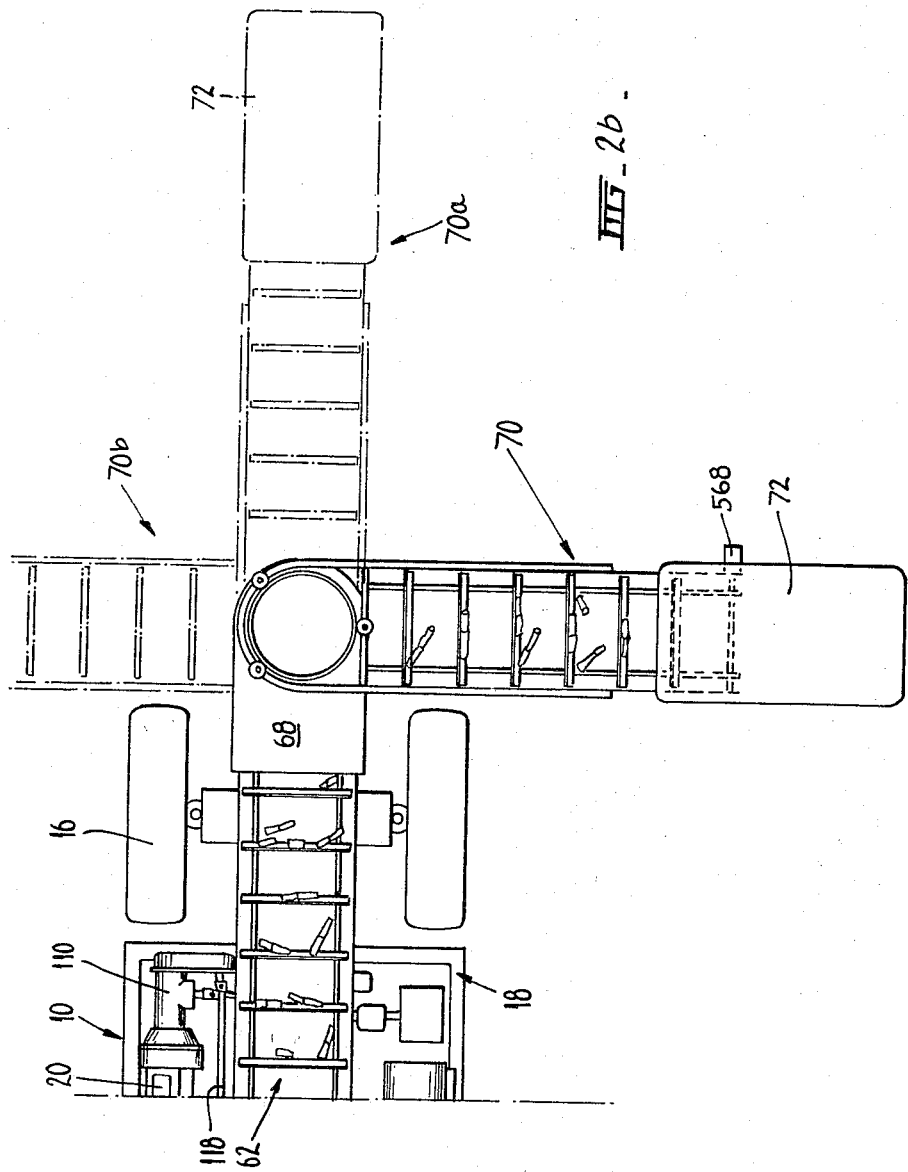
FIGURE 4 is a sectional plan view of the rear of the engine, the clutch, gearbox and drive shafts.
Figure 5:
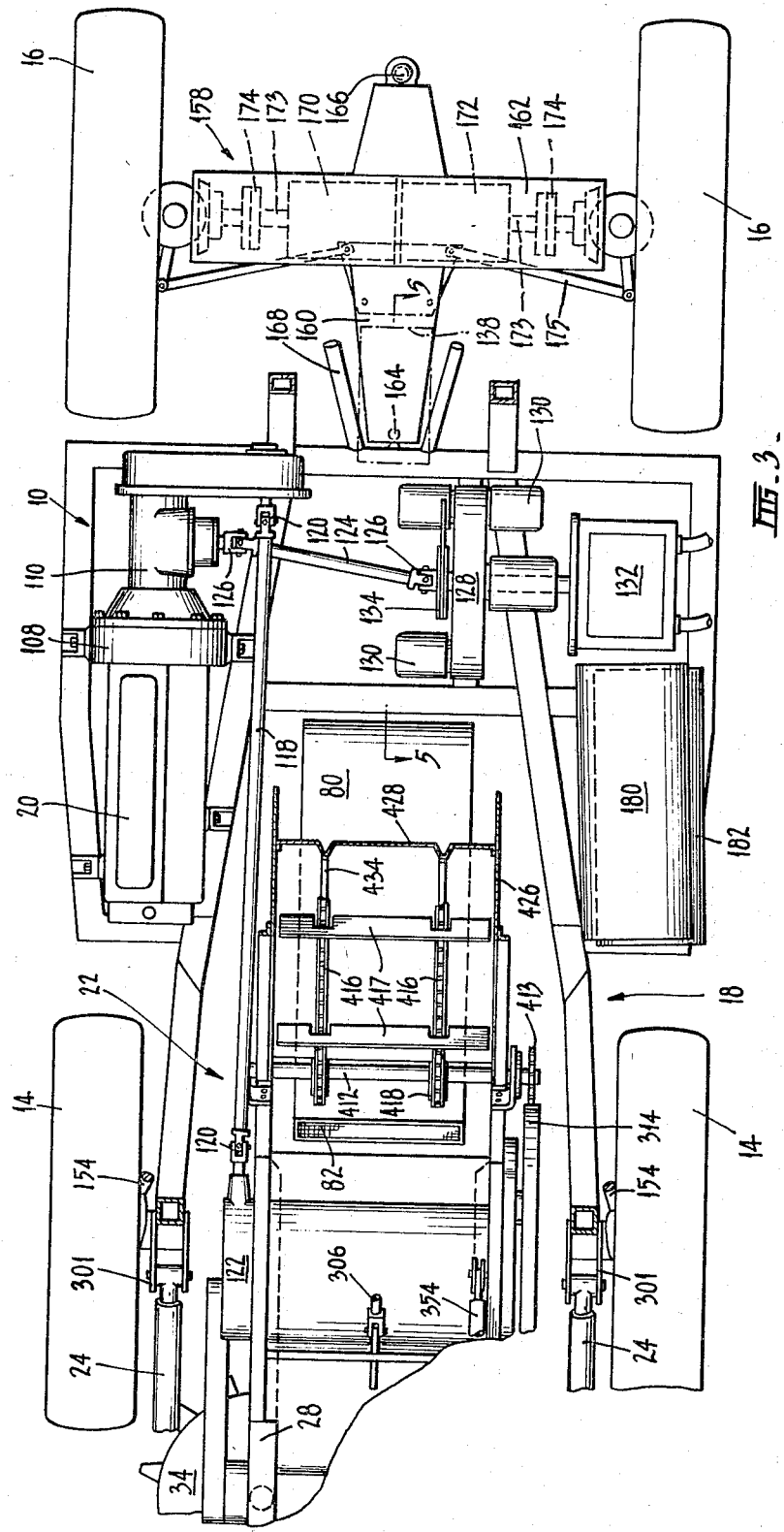
FIGURE 5 is a section on line 5—5 of FIGURE 3, showing the gearbox for the auxiliary hydraulic pumps and the drive to the fan for the water and hydraulic fluid cooler.

Power unit 10, which is illustrated in FIGURES 3, 4 and 5, comprises a rigid frame 18 provided with two pairs of transport wheels 14 and 16 of which the rear pair 16 is steerable. The overall width of the power unit 10 is such that it may pass between alternate rows in a crop of standing cane so as to pass along and cut an intermediate row without damaging the two rows on either side thereof, and the frame 18 is disposed wholly between the said transport wheels. Cover plates (not shown) are mounted on the sides of the frame between the wheels to prevent entanglement of vegetation with the equipment carried by the frame.

Power unit 10 is provided at one side with a diesel or other suitable engine 20 which serves both to propel the machine and to actuate or supply the power to actuate the several components of the mechanism. For this purpose the engine 20 is preferably arranged longitudinally on the frame 18 of the power unit with its crankshaft projecting towards the rear of the machine. The crankshaft is arranged to drive two concentric output shafts 104 and 106 (see FIGURE 4) of which the shaft 106 surrounds the shaft 104. Shaft 106 is continuously driven by the engine and is arranged, as will be hereinafter described, to drive a plurality of hydraulic pumps for actuating the hydraulic units of the machine. The connection of the crankshaft of the engine 20 to shaft 104 is through a clutch 108. Shaft 104 rotates at engine speed, projects rearwardly from gear box 110 and has mounted on it a sprocket 112 which, by means of chain 114, drives sprocket 116 connected to longitudinal drive shaft 118. Shaft 118 has an overload clutch adjacent its rear end, and is provided with universal joints 120 adjacent each of its ends. The forward end of this shaft is supported in a bevel gear box 122 (see FIGURES 3 and 13) on intermediate unit 22.

Shaft 106 (see FIGURE 4) is driven directly from the flywheel of the engine through clutch pressure plate 123 and drives a further shaft 124 projecting from one side of the gearbox 110 towards the side of the machine opposite that on which the engine 20 is mounted. The connection between shafts 106 and 124 is through a pair of bevel gears 125. Shaft 124 is provided with a pair of universal joints 126 adjacent either end and is connected through a gearbox 128 which drives four hydraulic pumps 130 for the various hydraulic units of the machine, to hydraulic pump 132 which is used to drive the traction wheels.

A V-pulley 134 (see FIGURE 5) on a shaft 135 projecting from gearbox 134 drives the fan 136 of an air cooling unit 138 by means of V-belt 140 and pulley 142 on the fan shaft. Cooling unit 138 is a dual cooler having circulating passages for both hydraulic fluid and engine cooling water.

Figure 10:
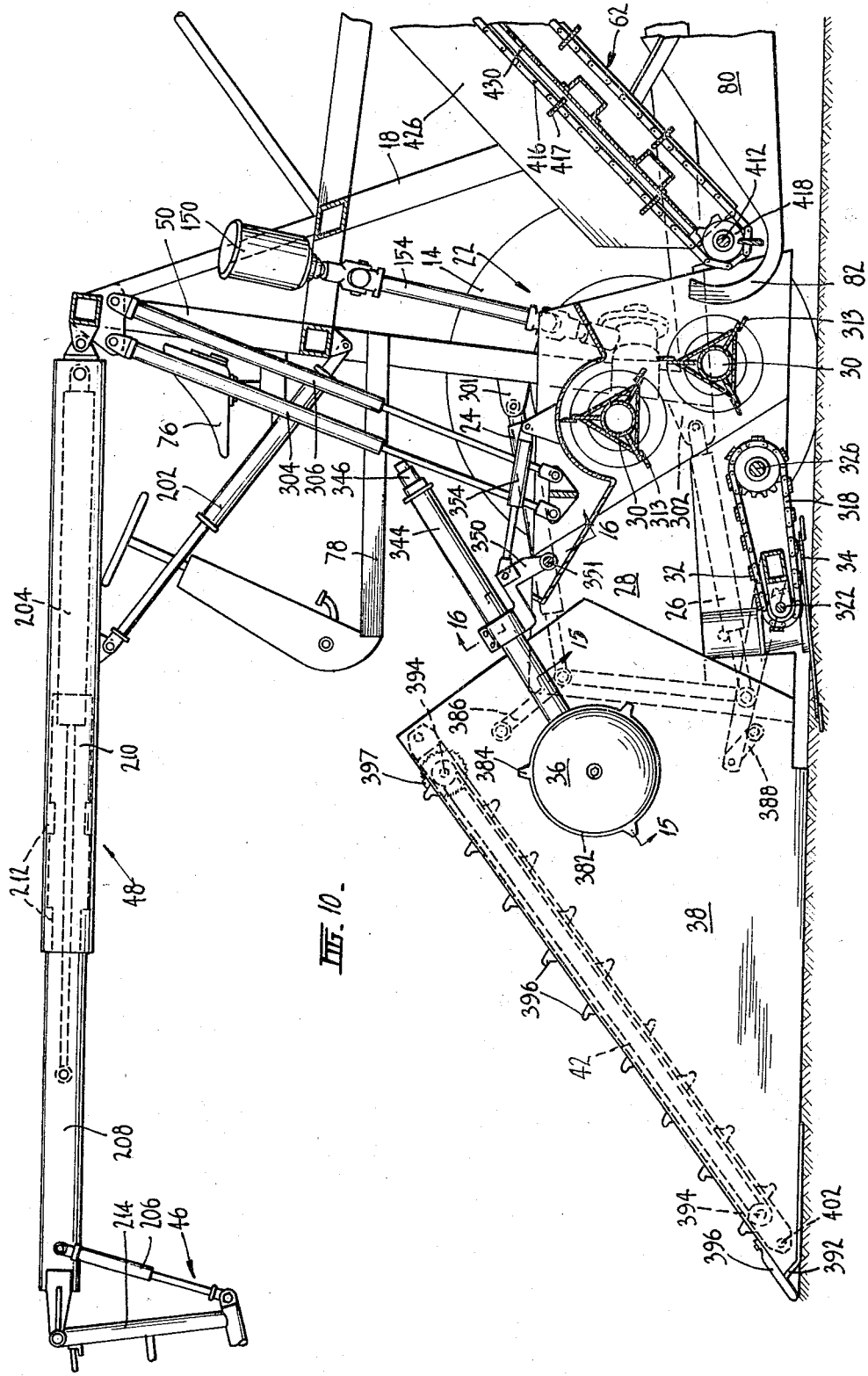
FIGURE 10 is a side view, partly in section, taken on line 10—10 of FIGURE 9.
Figure 11:
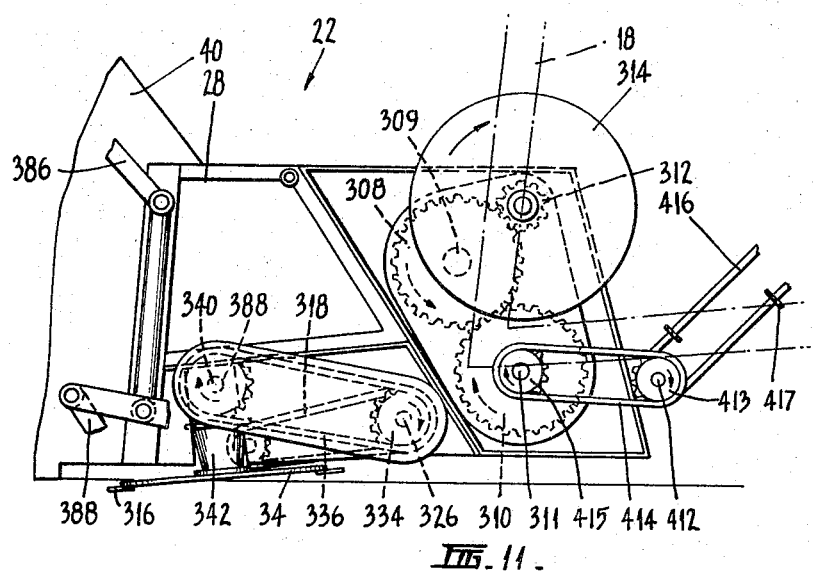
FIGURE 11 is a diagrammatic side view of part of the drive mechanism for the intermediate unit taken on line 11—11 of FIGURE 9.
Figure 12:
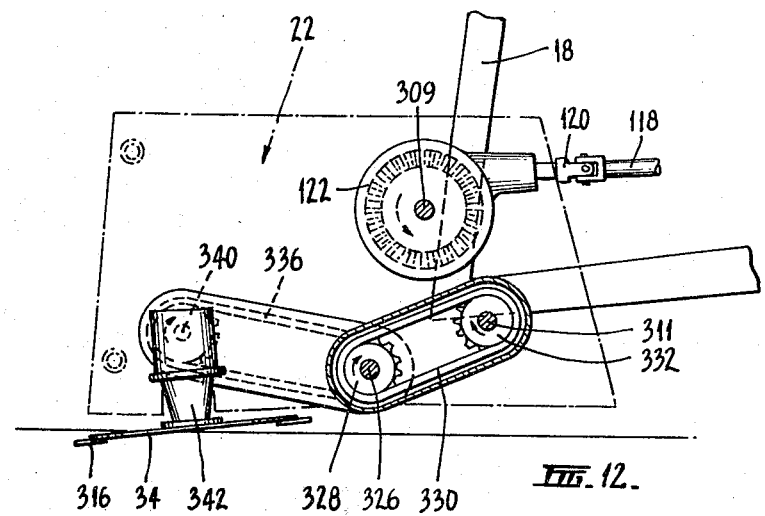
FIGURE 12 is a diagrammatic side view of part of the drive mechanism for the intermediate unit taken on line 12—12 of FIGURE 9.

Two individual hydraulic drive motors 150 (of which only one is shown in FIGURES 1a and 10) for the front wheels 14 are mounted on the frame 18 adjacent its front end and are connected to the front wheels by respective universal shafts 154. The rear axle assembly is mounted in a cruciform frame generally indicated at 158 in FIGURE 3, having one member 160 generally parallel with the axis of the harvester and a cross member 162 arranged generally transversely of the harvester. The longitudinal member 160 is mounted at its forward end on a ball joint 164 on the frame 18, and at its rear end is supported by a ball joint 166 mounted on an auxiliary support frame 168 depending from the frame 18. Individual hydraulic drive motors 170 and 172 for the rear wheels are mounted within the cross member 162 and are connected by means of respective universal shafts 173 and gearing (not shown) to the rear wheels 16. Respective brake drums 174 are mounted on the universal shafts 173.

As previously indicated these wheels are steerable and for this purpose are mounted on respective stub shafts (not shown) rotatable about king pins by means of a steering linkage of which the tie bar is shown at 175.

To enable the harvester to travel at increased speed when it is not operating as a harvester, there is provided an isolating valve (not shown) by means of which the operator can disconnect the hydraulic drive motors 170 and 172 for the rear wheels from hydraulic traction pump 132 so that the whole of the pump output is fed to the front wheel motors.

To enable the harvester to turn in a relatively small circle in confined spaces, there are provided two isolating-reversing valves, one for each of the hydraulic drive motors 150. Where the harvester is required to turn in a small circle to the left, for example, the drive to the left front wheel may be disconnected by means of its respective valve so that its wheel does not exert any driving torque. For even sharper turns the valve may be moved to its reversed position wherein it feeds hydraulic fluid through the respective drive motors 150 in the reverse direction to provide a positive torque which assists in turning the harvester.

Storage tanks for fuel 180 and hydraulic fluid 182 are mounted on the frame 18.

*Top cutter unit*

The top cutter unit 46, which is illustrated in FIGURES 6, 7, 8 and 10, is mounted at the forward end of an extensible boom 48 pivotally attached to an upwardly extending frame section 50. The boom, and therefore the top cutter unit 46, may be raised and lowered by means of a hydraulic cylinder 202 and extended or retracted by means of a further hydraulic cylinder 204 mounted within the boom. The attitude of the top cutter unit 46 may be adjusted by means of a further hydraulic cylinder 206. The boom-raising cylinder 202 is pivoted at one of its ends to the boom and at its other end to the upwardly extending frame section 50. The boom-extending hydraulic cylinder 204 is arranged within the boom and has one of its ends connected to the inner section 208 of the boom 48 and its other end connected to the outer section 210 of the boom. Operation of this cylinder to extend or retract the boom causes the inner section 208 to slide within the outer section 210, and for this purpose there are provided bearings in the form of nylon pads 212 secured to the inside of the outer section 210.

Hydraulic cylinder 206 is pivotally attached at one of its ends to the inner section 208 of the boom and at its other end to a portion of the top cutter unit 46. By adjustment of cylinders 202 and 204 the cutting disc 56 of the top cutter unit may be raised and lowered through a wide range of heights and may be extended or retracted and thus may be placed in the most suitable position for the particular conditions of harvesting.

Cutter disc 56 normally requires to be oriented in a plane inclined forwardly at an angle of 15° to the horizontal for best operation and this attitude is achieved by means of cylinder 206. Operation of hydraulic cylinder 202 to raise or lower the cutter unit 46 will alter the angle of attack of cutter disc 56 and thus necessitate adjustment of hydraulic cylinder 206. Control of cylinder 206 may be manual by means of a valve operated by the driver, or alternatively, cylinder 206 may be connected hydraulically with cylinder 202 so that adjustment of the angle of the top cutter unit is automatic. In this latter case there is preferably an over-riding control by the driver.

Figure 6:
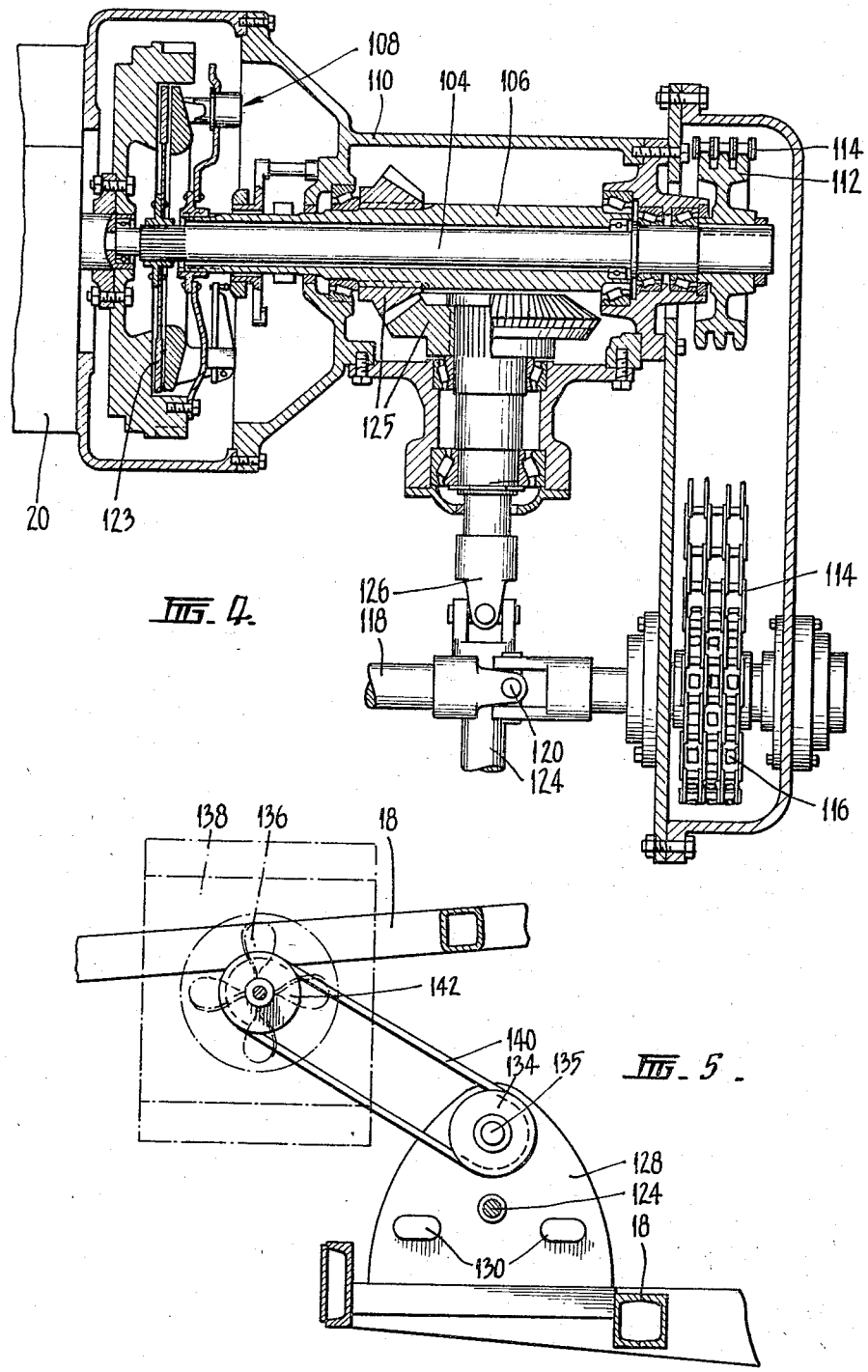
FIGURE 6 is a sectional side view of the top cutter unit taken on line 7—7 of FIGURE 6.
Figure 7:
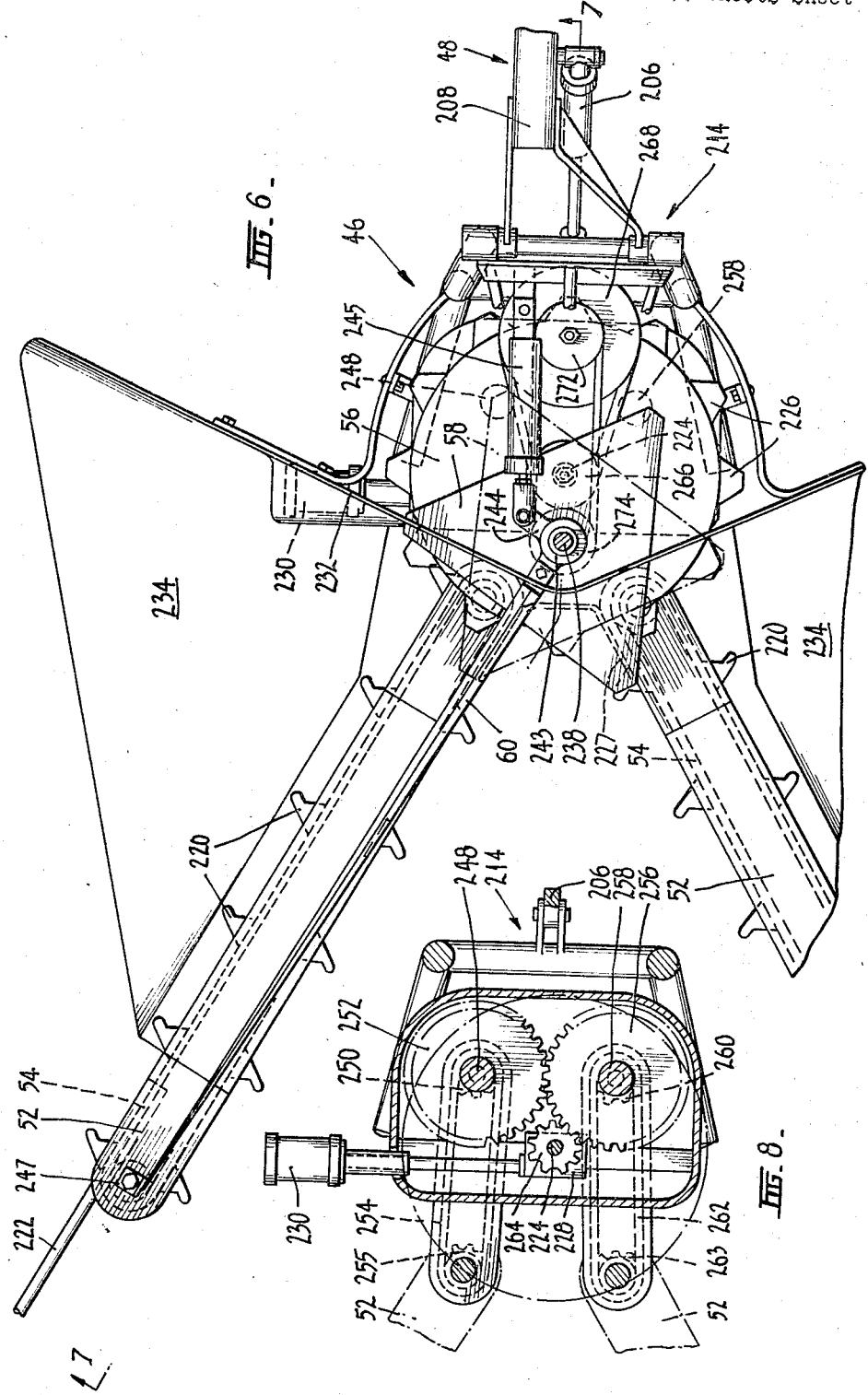
FIGURE 7 is a side view, partly in section, of the top cutter unit.
Figure 8:
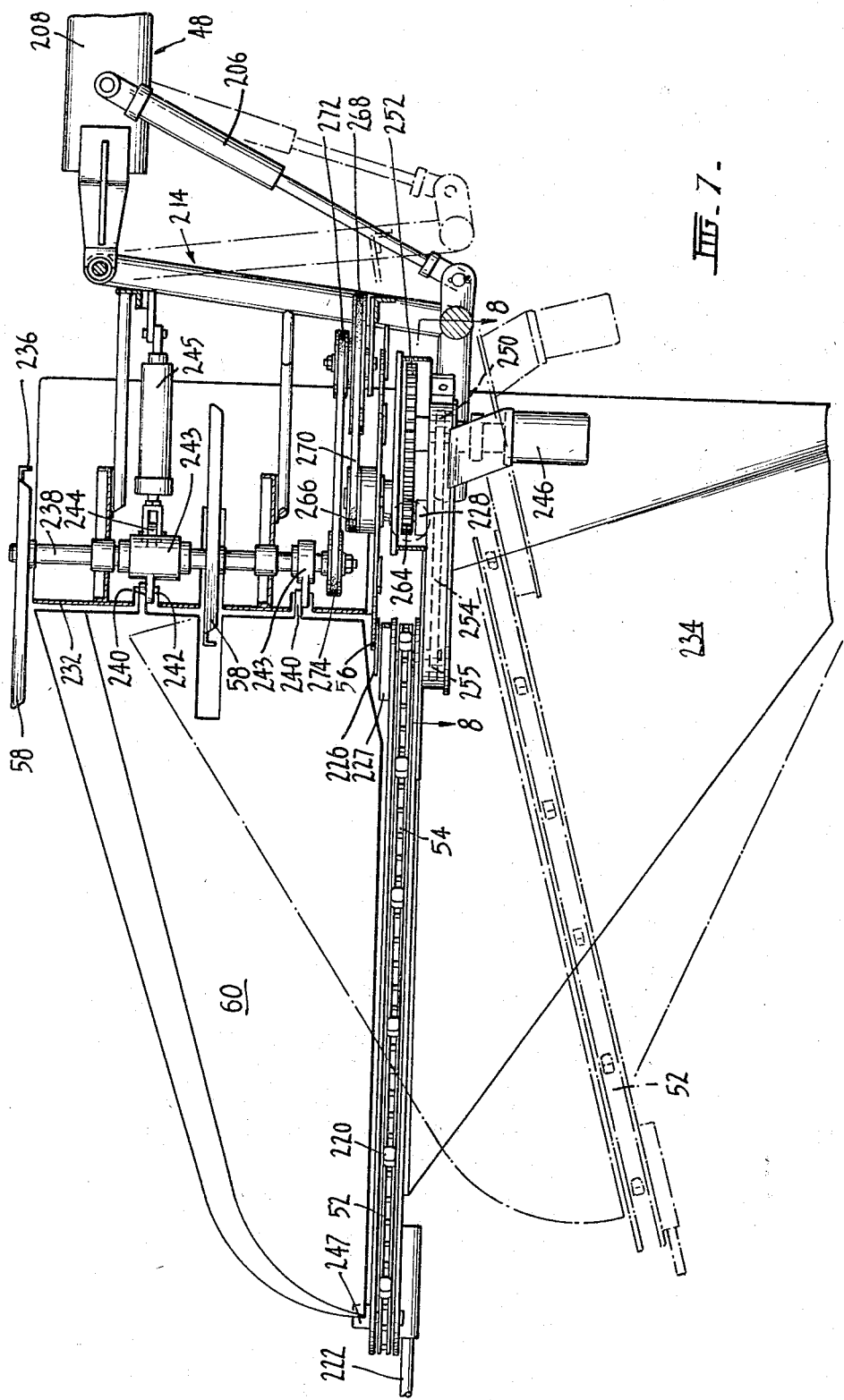
FIGURE 8 is a plan view, partly in section, of certain integers of the drive mechanism for the top cutter unit taken on line 8—8 of FIGURE 7.

Top cutter unit 46 is shown arranged with its cutter disc 56 horizontal in FIGURES 6, 7 and 8 for clarity, while its normal operating position is shown in dotted lines in FIGURE 7 and in full lines in FIGURE 1a.

The top cutter unit itself comprises a frame, generally indicated at 214, which is pivotally attached adjacent its upper extremity to the free forward end of the inner section 208 of the boom 48. A pair of divergent gathering arms 52 extend forwardly from the frame 214 of the top cutter unit, the angle between the arms being approximately 60°. Each gathering arm 52 supports an endless conveyor 54 provided with projecting fingers 220. The chains of the conveyors 54 are totally enclosed within the gathering arms 52 so that they will not become entangled with weeds, vines or cane tops and only fingers 220 project from the gathering arms to engage the tops. Rotation of the conveyors 54 is in a direction to feed the tops to the cutter disc 56. If necessary the gathering arms 52 may be extended by the provision of extension rods 222.

The cutting disc 56 is mounted on a rotatable shaft 224 and is provided with a plurality of cutting blades 226 rivetted or otherwise secured to its underside and projecting radially beyond its circumference. Cutting blades 226 co-operate, depending on the direction of rotation of disc 56, with one or other of a pair of upstanding projections or anvils 227 mounted one on each gathering arm adjacent the rear end thereof. Shaft 224 is mounted in a bearing block 228 (see FIGURE 8) which may be moved back and forth between limiting positions by means of a hydraulic cylinder 230 for a purpose which will hereinafter appear.

An upstanding wall 232 is supported on the frame 214 of the top cutting unit immediately behind the forward portion of the cutter disc 56, and this wall when viewed in plan, is approximately of V-shape with its forward end disposed immediately behind the front of the cutter disc 56 and with the side portions thereof inclining rearwardly and outwardly so as to deflect the severed tops to one side or the other of the machine. In addition outwardly and downwardly and downwardly inclined wings or guide plates 234 are arranged between the outer sides of the gathering arms 52 and the lower portions of the respective rearwardly and outwardly inclined side portions of the rear wall 232 to assist in deflecting the severed tops clear of the machine. The wings 234 and the rear wall 232 are made of sheet metal and preferably each wing is constructed integrally with one of the rearwardly and outwardly extending portions of the rear wall 232.

Since it is usually desired to deflect the cut tops to a particular side of the machine, the direction of rotation of the cutting disc 56 is reversible, as will hereinafter be explained, and there is provided a pair of rotatable flingers 58 to assist in projecting the cut tops to the selected side of the machine and a deflector plate 60 which prevents the top falling from the incorrect side.

Each of the flingers 58 is made from a generally triangular piece of sheet metal and has a depending flange 236 on each of its three sides. The flingers 58 are fixedly mounted on a rotatable shaft 238 and are oriented relatively to each other such that the apices of the upper triangular flinger are mid-way between the apices of the lower flinger when viewed in plan.

The deflector plate 60 is pivotally mounted on shaft 238 by means of arms 240 which passes through slots 242 in rear wall 232 and are connected to bosses 243 rotatably mounted on shaft 238. A lever 244 is welded to and projects from upper boss 243 and is pivotally engaged at its outer end with a hydraulic cylinder 245, the other end of which is pivotally attached to frame 214. Deflector plate 60 can be moved back and forth between stops 247 on the gathering arms 52 by means of hydraulic cylinder 245. In one of its limiting positions deflector plate 60 is aligned with one of the gathering arms 52, and in its other limiting position is aligned with the other gathering arm. In FIGURES 6 and 7 it is shown aligned with the right-hand gathering arm.

The drive for the top cutter unit is from a hydraulic motor 246 mounted beneath the frame 214 and having an upwardly projecting shaft 248. A sprocket 250 and a gear wheel 252 are fixed to the shaft 248. Sprocket 250 provides a uni-directional drive to one of the gathering chains 218 by means of chain 254 and sprocket 255, while gear wheel 252 drives a similar gear wheel 256. The latter gear wheel is mounted on a shaft 258 to which is also attached a sprocket 260. A chain 262 drives the other of said gathering conveyors 54 from the sprocket 260 through sprocket 263.

Rotatable shaft 224 for the cutter disc 56 carries a gear wheel 264 which is adapted to mesh with either gear 252 or gear wheel 256 (see FIGURE 8) depending on which of its limiting positions it is occupying under the influence of hydraulic cylinder 230. By this means the direction of rotation of the cutter disc 56 is reversible.

Shaft 224 also carries a V-pulley 266 (see FIGURE 7) which drives idler reduction pulley 268 through a V-belt 270 and hence shaft 238 for the flingers 58 through V-belt 272 and V-pulley 274 carried by shaft 238. Thus, since the flingers are driven from the cutting disc shaft they are driven in the same direction as the cutting disc and will have their direction of rotation reversed when that of the cutting disc is reversed. It should be noted that reversal of the cutting disc and flingers does not reverse the conveyors on the gathering arms.

The direction of rotation of the hydraulic motor 246 is such that when the hydraulic cylinder 245 operates deflector plate 60 to align it with the right-hand gathering arm 52 (as seen in plan view) and moves gear wheel 264 for the cutter disc 56 into engagement with gear wheel 256 the cutter disc 56 and fingers 58 will rotate anti-clockwise as seen in plan view to deflect the cut tops to the left-hand side of the machine. Cylinders 230 and 245 are preferably hydraulically interconnected with a hydraulic cylinder for rotating the discharge elevator 70 in such a manner that when discharge elevator 70 is in a position to feed cut cane to a truck travelling on the right-hand side of the harvester the top cutting unit will be discharging the tops to the right-hand side of the harvester and vice versa.

In this connection no problem arises when the cut crop is to be delivered to a truck travelling behind the harvester since deflector plate 60 moves relatively rapidly under the influence of hydraulic cylinder 245 and thus will travel from a position parallel to the left-hand gathering arm 52 to a position parallel to the right-hand gathering arm in less time than it will take for the discharge elevator to move from a position wherein it projects from the right-hand side of the harvester to a position wherein it projects to the rear of the harvester. Similarly deflector plate 60 will travel from a position of alignment with the right-hand gathering arm to alignment with the left-hand gathering arm in less time than it will take for the discharge elevator to travel from a position wherein it is projecting from the left-hand side of the harvester to a position wherein it is aligned with the harvester.

*Intermediate unit*

The intermediate unit, illustrated in FIGURES 9 to 13 inclusive, is carried at the forward end of the power unit and includes a chopper housing 27 having a pair of side walls 28. Each side wall 28 is attached to the frame member 50 by means of a respective pair of parallel pivoted links 24 and 26, pivotally attached to respective brackets 301 and 302 on frame 50, which permit the housing 27 to move vertically in relation to the frame, but maintain its orientation relative thereto.

The housing 27 is further connected to the frame member 50 by means of two hydraulic cylinders 304 and 306 (see FIGURE 10) pivotally attached to the top of the housing 27 and to the frame member 50 above and to the rear of the driving platform. The axes of these two hydraulic cylinders pass approximately through the centre of gravity of the intermediate unit. The first hydraulic cylinder 304 acts as a hydro-pneumatic spring thus counter-balancing to a substantial extent the dead weight of the housing. The other cylinder 306 is used to elevate the housing to transport position and to adjust the cutting height of the cutter discs 34 as will be hereinafter explained.

A pair of rotatable chopper drums 30 which may be similar to those described in our prior Patent No. 2,953,886 are supported in bearings in the side walls 28. The upper chopper drum is mounted above and somewhat forward of the lower chopper drum and is directly driven by shaft 118 through bevel gearbox 122 located on the right-hand side of the machine. The lower chopper drum is driven from the upper chopper drum by means of a pair of gears 308 and 310 mounted on the left-hand ends of the upper and lower chopper drum shafts 309 and 311 (see FIGURES 11 and 13). The gears 308 also serve to time the chopper drums 30, each of which is provided with three blades 313 which have a small radial overlap with the blades of the other drum and zero nominal circumferential clearance. Spur gear 308 on the left-hand end of the shaft 309 of the upper chopper drum 30 meshes with a gear wheel 312 on a flywheel 314, the purpose of which is to smooth out cyclical fluctuations in the speed of rotation of the chopper drums.

A pair of base cutter discs 34 adapted to sever the crop at or slightly below ground level and a base conveyor 32 to feed the cut crop to the chopper drums 30 are also mounted in the housing 27. Each of the discs 34 is inclined inwardly and forwardly at a small angle, for example, 4° inward and 6° forward. Each of the discs 34 is provided on its periphery with a plurality of cutter blades 316 and the distance between centres of the discs 34 is such that there is a small radial overlap between the cutter blades 316 of the respective discs.

The base conveyor 32 comprises two roller chains 318 carrying a plurality of slats 320 which are slightly crowned to follow the inclination of the cutter discs 34. The open construction of the base conveyor 32 permits a large proportion of the trash, stones and loose soil gathered with the crop to drop through onto the ground. In addition there is a gap of approximately 4 inches between the delivery end of conveyor 32 and the chopper drums 30 for the same purpose. Chains 318 are mounted on respective pairs of sprockets 322 and 324 of which the sprockets 324 are mounted on a shaft 326 which carries a drive sprocket 328 at its left-hand end. Sprocket 328 is driven by means of a chain 330 from a sprocket 332 mounted on the left-hand end of the shaft 311 of the lower chopper drum 30.

The base cutter discs are driven (see particularly FIGURE 13) from shaft 326 by means of sprockets 334 mounted on that shaft, chains 336, and sprockets 338, mounted on horizontally projecting shafts 340 of bevel drive units 342. These drive units are constructed and mounted so that their output shafts on which the cutter discs 34 are supported, extend outwardly at 4° to the vertical and rearwardly at 6° to the vertical to provide the correct inclination of the cutter discs as above described.

The whole of the above described drive mechanism is located outside the walls 28 to provide a smooth throat through which the crop may pass.

A rotary feeder drum 36 (shown generally in FIGURES 9 and 10 and more particularly in FIGURES 15 and 16) is also mounted between the walls 28 of the housing 27. The drum is mounted at one end of a supporting arm 344, at the other end of which is located a hydraulic motor 346. Supporting arm 344 is adjustably mounted in a clamp 348 on a bracket 350 pivoted on a shaft 351 passing between the side walls 28. Drum 36 may be forwardly extended or retracted by loosening the bolts of clamp 348 and sliding suppporting arm 344 to the required position. A length of rod 352 welded longitudinally on supporting arm 344 is held in clamp 348 to prevent turning of supporting arm 344 in the clamp 348.

A hydraulic cylinder 354 pivotally connected at one of its ends to bracket 350 and at its other end to side wall 28, can be operated to adjust the height of drum 36 or may be released to allow the drum to rest on the cut cane as it is being fed to the chopper drums.

Feeder drum 36 (see FIGURE 15) comprises two end sections 356 and 358 mounted on the opposite ends of a central shaft 360, and held in position by respective nuts 362, which are located in recesses 364 in the end walls of the drum sections. A gap is left between the end sections 356 and 358 to accommodate supporting arm 344 and this gap is closed by a cylindrical liner 366 supported from support arm 344. A shaft 368 within the support arm is connected at one end to the hydraulic motor 346 and at its other end is provided with a bevel gear 370 adapted to mesh with a bevel gear 372 fixed to shaft 368.

Respective spiders or supporting discs 374 and 376 are welded within the respective drum sections 356 and 358 at positions spaced from the closed ends thereof and are provided with central bosses 378, 380 keyed to shaft 360. The purpose of these spiders or discs is to centralise the drum sections on the shaft 368 and at the same time to transmit part of the drive to the drum sections through the keyed bosses. Each of the drum end sections 356 and 358 is covered by a strip of rubber 382 having a plurality of projecting lugs 384. As can be seen on the drawing the ends of the drum are smooth and have no projecting shafts around which vines and weeds would tend to wrap themselves during operation of the harvester. Supporting arm 344 is offset from the centre of the drum mainly to enable it to clear hydraulic cylinders 304 and 306.

When the harvester is operating on straight untangled cane drum 36 is raised to a suitable height by means of hydraulic cylinder 354 so that it can operate to deflect the canes forwardly before they are cut by base cutter discs 34. Cane in this condition is fed readily to the chopper drums 30, without the assistance of drum 36, by base conveyor 32, and drum 36 could be replaced by a pusher bar (not shown).

When the harvester is to be used to cut badly sprawled and tangled cane hydraulic cylinder 354 is released to allow drum 36 to rest on top of the bundle of cane as it is being fed to the chopper drums. Rotation of drum 36 assists base conveyor 32 to feed the bundle of cane, and in addition the intermittent contact of lugs 384 with the top of the bundle, raises drum 36 and then allows it to fall onto the top of the bundle, thereby giving it a tamping action which further assists in feeding the cane.

To permit ready access to the intermediate unit for maintenance purposes, links 24 and 26 are of telescopic construction, each having two sections, one of which slides inside the other. When maintenance is required, the unit is lowered to the ground, the locking means of the relatively sliding link sections are removed and the harvester is backed away from the unit, leaving the latter freely accessible. Boom 48 may be used as a crane to raise parts of the unit if necessary.

*Gathering walls*

A pair of spaced gathering walls 38 and 40 (see FIGURES 9 and 10) is carried at the forward end of the housing 27, each gathering wall being supported from a wall 28 by means of a pair of forwardly extending links 386 and a pair of trailing links 388. This connection permits relative vertical rotational movement between the gathering walls 38, 40 and the housing 27, and in particular permits the front ends of the gathering walls to be raised when necessary to clear obstacles. The links 386 for each gathering wall are spaced from each other (see FIGURE 9), as are the links 388 of each wall to resist horizontal deflection of the front edges of the gathering walls. The upper edges of the walls 38, 40 extend downwardly and forwardly and each is provided with a spur 390, which during operation extends slightly below ground level to pass under and assist in raising fallen sticks of cane. The upper edges of the walls 38 are curved outwardly so that they can guide fallen canes as they are being raised without damaging them in any way. The forward end of each gathering wall 38, 40 is provided with a sole plate 392 to prevent digging into the ground. A sliding shoe 393 adapted to rest on the ground is pivotally attached to the lower edge of each gathering wall 38, 40. The sliding shoes form part of a mechanism, including hydraulic cylinder 306, for controlling the height of the housing 27 and therefore the height of the base cutter blades 34 in dependence upon the contour of the surface over which the harvester is passing, but since this mechanism forms no part of the present invention, it will not be further described herein.

Adjacent the forwardly sloping upper edge of each of the gathering walls 38, 40 is mounted a gathering conveyor 42 or 44 respectively. This conveyor may be in the form of a chain conveyor with projecting fingers as shown at 42 or in the form of an auger as shown at 44. It will be appreciated that in general both conveyors will be of the same form, but one of each has been shown for the purposes of this description.

Conveyor 42 is in the form of an enclosed endless chain mounted on sprockets 394, which are driven by a variable speed hydraulic motor 395. Fingers 396 project from the housing of the conveyor to contact the crop and a saw blade 397 is mounted on the shaft of the upper sprocket 394.

Auger 398 is mounted with its flights projecting above the forwardly sloping upper edge of the gathering wall 40 to contact the crop and is driven by a variable speed hydraulic motor 401. A cutter 399, having cutting edges 400, is non-rotatably mounted at the upper end of the auger 398.

During operation of the harvester the gathering walls slide along the surface of the ground on each side of a row of cane with their spurs travelling slightly below the surface in order to pass under and lift fallen sticks of cane. These canes are then contacted by the respective conveyors 42 or 44 which move in a direction such that their fingers or flights respectively raise the canes up the forwardly sloping surface of the gathering walls 38 and 40. Any overhang of the canes is cut off by the cutters at the top end of the conveyors.

The respective conveyors 42, 44 may be driven by their motors, under the control of the operator, at any selected speed up to that at which their crop engaging projections travel rearwardly of the machine at a speed equal to the forward ground speed of the machine. The operator can adjust this speed to suit the particular harvesting conditions.

Figure 9:
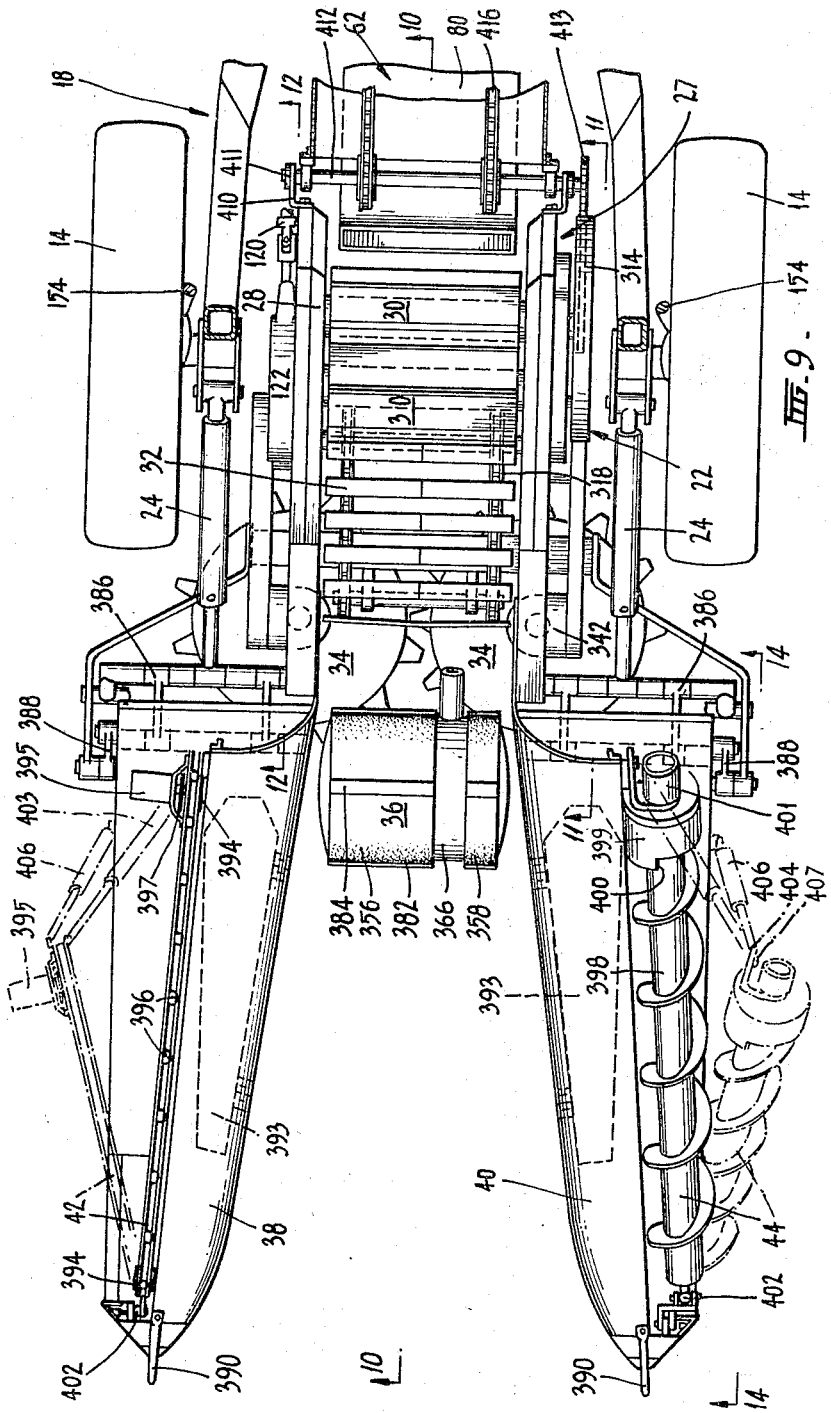
FIGURE 9 is a plan view, partly in section showing the intermediate unit and the gathering walls.

The lower end of each conveyor is supported by a respective ball joint 402, while the respective upper ends may be fixedly supported on the gathering walls or may be adjustably supported on telescopic links as shown in dotted lines in FIGURES 9 and 14. The support is the same for each conveyor and consequently the support of only one will be described.

A first telescopic link 403, having a ball joint 404 at each end is pivotally connected at one end to the upper part of gathering wall 40 and at its other end to the upper part of conveyor 44. A clamping means 405 is adapted to hold the link to its selected length. A second telescopic link 406, having a ball joint 407 at each end, is pivotally connected at one end to the lower part of gathering wall 40 and at its other end to the upper part of conveyor 44. A clamping means 408 is adapted to hold this link to its selected length.

Telescopic links 403 and 406 may be used where required by the particular harvesting conditions to set the gathering conveyors to positions wherein they are inclined to the horizontal at any angle between 35° and 75° and inclined outwardly from the lower ball joint connection at any angle up to 15° to the axis of the harvester.

Thus as described the gathering walls serve to raise fallen canes, to guide canes into the cutter discs 34, and to adjust the height of the cutter discs so that the canes are cut off at or slightly below ground level. This last feature is of importance since the base portion of the sugar cane contains the highest percentage of sugar and hence the cane should be cut as low as possible.

*Primary elevator*

At the rear of each of the side walls 28 of the intermediate unit is mounted a bracket 410 supporting a universal bearing 411. Bearings 411 support the lower shaft 412 (see FIGURES 9, 10 and 11) of the primary elevator 62. A sprocket 413 on the right-hand end of shaft 412 is driven by a chain 414 from a sprocket 415 on the right-hand end of the shaft 311 of the lower chopper drum 30. Primary elevator 62 has a pair of chains 416 connected by transverse slats 417, the chains being supported by a pair of sprockets 418 on shaft 412, and a pair of sprockets 420 on upper shaft 422. Shaft 422 is adjustable by means (not shown) to correctly tension chains 416.

The casing of elevator 62 has a pair of side walls 426 and a base 428 in which are formed perforations or slots 430 to permit stones, dirt and the like to drop through. As an alternative to the perforations or slots 430, part of the base 428 may be formed of mesh for the same purpose. The base 428 is provided with a pair of longitudinal guides 432 (best seen in FIGURE 21) having wear strips 434 positioned and spaced to support the chains 416, thereby raising the slats 417 slightly above floor level to reduce friction. Each of the strips 434 is of a width to fit between the side plates of chains 414 so that the rollers of the chains will be supported by and will roll on the strips.

To enable elevator 62 to move freely with the intermediate unit it is supported adjacent its upper end on a pair of rollers or wheels 64 mounted on the frame of the power unit (see FIGURE 17).

The primary elevator 62 delivers the cane to a hood 68 into which its upper end projects. The speed of the elevator is such that the pieces of cane are thrown into the hood rather than allowed to drop into it from the end of the elevator.

*Hood*

The hood 68 (see FIGURE 17) is mounted on the upper end of a vertically extending frame member 502. The top of the hood is enclosed with the exception of a circular outlet opening 504 for a purpose which will be hereinafter described. A flexible sealing lip 503 of rubber or the like is arranged between the upper end of elevator 62 and its inlet opening in hood 68.

The hood is in somewhat the form of a hopper and has a discharge opening 506 adjacent its lower end through which the cane delivered by the primary elevator 62 passes to the secondary elevator 70.

*Secondary elevator*

Secondary or discharge elevator 70 is constructed in a manner very similar to primary elevator 62, having a pair of chains 550 carrying slats 552, side walls 554, a base 556, and guides and wear strips similar to guides and wear strips 432 and 434 on elevator 62 (see FIGURE 21). Chains 550 run on sprockets 560 and 562 mounted on respective upper and lower shafts 564 and 566, of which the upper shaft 564 is driven by a hydraulic motor 568 (see FIGURE 2b).

Guide flap 72, the outer end of which is curved downwardly, is pivotally mounted on the upper end of the casing of this elevator and serves under the control of hydraulic cylinder 74 to direct the cut cane into a truck or transporter travelling behind or alongside of the harvester as the cane is projected from the upper end of the elevator. By manipulation of this flap substantially even distribution of the crop in the truck or transporter may be obtained. Control of hydraulic cylinder 74 is from the driving platform, but if required a further control may be suspended from the elevator for manipulation by an operator whose specific duty it is to control the distribution of cane in the truck.

On the lower end of the casing of the elevator 70 is mounted an inlet chamber 570 having an upper opening 572 adapted to register with discharge opening 506 in hood 68. In the lower portion of chamber 570 is a feed opening 574 adapted to deliver cane to the lower end of elevator 70. Also in the lower portion of chamber 70 is further opening 576 covered by a grille 86.

A shaft 578 projects vertically downwards from the lower end of elevator 70 and is rotatable in a bearing 580 on frame 18 by means of a chain and quadrant mechanism, generally indicated at 584 in FIGURE 17 and illustrated in more detail in FIGURE 18 and 19. This mechanism comprises a quadrant 586 affixed to shaft 578 having two circumferential grooves, an upper groove 588 and a lower groove 590. At one end of groove 588 and at the opposite end of groove 590 are provided anchoring brackets 592 and 594 respectively.

A second quadrant 596 having upper and lower grooves 598 and 600 respectively, is mounted for rotation on a shaft 602 projecting vertically upwards from frame 18. Quadrants 586 and 596 are arranged in a common horizontal plane with their circumferential edges virtually touching. A flexible roller chain 604 has one of its ends anchored to bracket 592 and passes around the groove 588 in quadrant 586 to the tangent point between the two quadrants where it leaves groove 588 and passes around groove 598 in quadrant 596 and has its other end anchored to a bracket 606 on quadrant 596. A further chain 608 having one of its ends anchored to bracket 594 passes around groove 590 to the tangent point between the two quadrants where it leaves groove 590 and passes around groove 600 to have its other end anchored to a further bracket 610 at the end of groove 600.

Quadrant 596 is rotatable back and forth through an angle of approximately 150° by means of a hydraulic cylinder 612 having one of its ends pivotally connected to frame 18 and its other end pivotally connected to quadrant 596. It will be appreciated that in order to swing secondary elevator 70 from a position in which it extends from the left-hand side of the harvester to a position in which it extends from the right-hand side of the harvester it is necessary that quadrant 586 rotate through an angle of 180°. Hence, in order to achieve this movement of quadrant 586 as a result of moving quadrant 596 through 150°, quadrant 586 is somewhat smaller in diameter than quadrant 596.

Elevator 70 is further supported by pairs of upper and lower bracing members 620 and 622 (see FIGURES 17 and 20), one member of each pair being affixed to each side of the casing of the elevator. These bracing members pass around an upwardly extending flange 624 surrounding top opening 504 in hood 68, and support a plurality of rollers 626 which run in a groove 628 on flange 624. This arrangement assists in supporting the discharge elevator 70 and minimizes the friction to be overcome in rotating it between its predetermined discharge postions.

*Primary fan*

Mounted beneath frame 18 of power unit 10 is a primary air fan 80 driven by a hydraulic motor 650 and connected to a manifold 82 which delivers a stream of air vertically upwards between the chopper drums 30 and the lower end of primary elevator 62. This arrangement is designed to remove a substantial proportion of the trash in the harvested crop as it passes through the air between the chopper drums and the primary elevator.

*Secondary fan*

A further fan 84 driven by a hydraulic motor 660 is attached by means of its outlet duct to inlet chamber 570 of the discharge elevator 70, and has its outlet opening in register with opening 576 in the inlet chamber. This fan delivers a stream of air which passes upwardly through the crop as it is projected from the primary elevator 62 in order to entrain further trash and carry it out through top opening 504 in the hood 68. If so desired there may be provided a duct (not shown) to guide the trash down towards ground level on either side of the machine.

Thus there is provided a tall crop harvester and more particularly a sugar cane harvester having unique features whereby it is not subjected to the limitations of harvesters of the prior art. In addition there are provided improvements in various integers of a tall crop harvester which may be readily and advantageously used in connection with tall crop harvesters of any type.

As modifications within the spirit and scope of the invention may readily be effected by persons skilled in the art, it is to be understood that this application is not restricted to the specific details of the harvester particularly described above, but is limited only by the appended claims. As examples of modifications which may be incorporated in the machine there may be mentioned the substitution of pneumatic for hydraulic actuating mechanism.

What we claim is:

1. A cutter unit for a crop harvester including reversible rotatable cutter means, a pair of forwardly projecting divergent gathering arms arranged to guide the crop into the cutter means, and crop director means to selectively deflect cut material to one side or the other of the cutter unit depending on the direction of rotation of the cutter means.

2. The cutter unit of claim 1 wherein said crop director means includes a movable deflector plate swingable between positions above each of the gathering arms and about a vertical axis at the imaginary point of convergence of said gathering arms.

3. The cutter unit of claim 1 wherein said cutter means is rotatably driven about a vertical axis.

4. The cutter unit of claim 1 wherein said director means includes rotatable crop flinger means arranged to be driven the same direction as the cutter.

5. The cutter unit of claim 4 wherein said director means includes at least one plate member rotatable on a vertical axis ahead of the cutter axis, said plate member having crop engaging portions on its periphery.

6. The cutter unit of claim 4 wherein said director means includes a pair of vertically spaced triangular plate members mounted for rotation on a vertical axis ahead of said cutter axis.

7. The cutter unit of claim 1 wherein said gathering arms carry movable crop engaging means operable to carry the crop into said cutter means.

8. The cutter unit of claim 7 wherein said crop director means includes rotatable crop flinger means operable to direct crop material cut by said cutter means to one side or the other of the unit depending on the direction of rotation of the crop flinger means, power means for driving said crop engaging means in one direction and means for selectively driving said crop flinger means in either direction.

9. The cutter unit of claim 8 wherein said direction means also includes a deflector means movable between a position above one of said gathering arms to a position above the other arm, said director means and said flinger means cooperating with said cutter means to direct all of the cut material to one side or the other of the cutter unit.

10. A tall crop harvester comprising a self-propelled power unit, crop gathering, cutting and chopping means carried by said power unit, crop top cutting means carried by said power unit including reversible rotary cutter means and selectively operable to discharge cut material to either side of the harvester and elevator and discharge means carried by said power unit and selectively operable to discharge cut and chopped material to either side of or to the rear of the harvester.

11. The harvester of claim 10 wherein said top cutting means is adjustably carried on said power unit and also includes gathering means, and deflection means, means for selectively driving said gathering, cutting and deflection means to cause the tops of cut material to be gathered, cut and deflected to one side or the other.

12. The harvester of claim 10 wherein said top cutting means also includes power operated gathering means, power operated rotary flinger means and a power positioned deflection member, said power operated means operable in combination to gather, cut and deflect the tops of crop material to one side or the other of the machine.

References Cited

UNITED STATES PATENTS

| 1,829,198 | 10/1931 | Speer | 198—100 |
| 2,516,277 | 7/1950 | Vichie et al. | 56—17 |
| 2,648,943 | 8/1953 | Shafer et al. | 56—17 |
| 2,702,979 | 3/1955 | Swingle | 56—59 |
| 2,953,886 | 9/1960 | Douglas et al. | 56—17 |
| 3,144,743 | 8/1964 | Gaunt et al. | 56—17 |

ABRAHAM G. STONE, *Primary Examiner.*

P. A. RAZZANO, *Assistant Examiner.*